US012657547B2

(12) United States Patent
Daniels et al.

(10) Patent No.: US 12,657,547 B2
(45) Date of Patent: Jun. 16, 2026

(54) ENTITY RESOLUTION AND CONSOLIDATION USING A UNIQUE IDENTIFIER

(71) Applicant: Exiger Holdings, Inc., New York, NY (US)

(72) Inventors: Brandon Daniels, Henrico, VA (US); Skyler Chi, New York, NY (US); Jonathan Ganucheau, Atlanta, GA (US)

(73) Assignee: EXIGER HOLDINGS, INC., New York, NY (US)

( * ) Notice: Subject to any disclaimer, the term of this patent is extended or adjusted under 35 U.S.C. 154(b) by 99 days.

(21) Appl. No.: 18/619,242

(22) Filed: Mar. 28, 2024

(65) Prior Publication Data

US 2024/0333678 A1 Oct. 3, 2024

Related U.S. Application Data

(60) Provisional application No. 63/455,693, filed on Mar. 30, 2023.

(51) Int. Cl.
*G06Q 10/0835* (2023.01)
*G06Q 10/0635* (2023.01)
*H04L 61/45* (2022.01)

(52) U.S. Cl.
CPC ..... *G06Q 10/0835* (2013.01); *G06Q 10/0635* (2013.01); *H04L 61/45* (2022.05)

(58) Field of Classification Search
CPC .................... G06Q 10/0835; G06Q 10/0635
See application file for complete search history.

(56) References Cited

U.S. PATENT DOCUMENTS 9,400,826 B2 7/2016 Adamson et al.
10,678,798 B2 6/2020 Lijachev et al.
(Continued)

OTHER PUBLICATIONS

Angelis et al., "Government's spending with small and medium-sized enterprises", Mar. 2016 https://www.nao.org.uk/wp-content/uploads/2016/03/Governments-spending-with-small-and-medium-sizes-enterprises.pdf (Year: 2016).*
(Continued)

*Primary Examiner* — Rupangini Singh
(74) *Attorney, Agent, or Firm* — CANTOR COLBURN LLP

(57) ABSTRACT

Examples described herein provide entity resolution and consolidation using a unique identifier for data with complex relationships gathered across a computer network from a plurality of sources. According to an aspect, a computer-implemented method includes receiving, by a processing device, supply chain data. The method also includes analyzing, by the processing device, the supply chain data to identify a unique entity and a doing business as (DBA) name associated with the unique entity. The method further includes generating, by the processing device, the unique identifier for the unique entity. The method additionally includes associating, by the processing device, the unique identifier with the unique entity and the DBA name associated with the unique entity and updating, by the processing device, the supply chain data to include the unique identifier for the unique entity and the DBA name associated with the unique entity.

18 Claims, 7 Drawing Sheets

(56)        References Cited

U.S. PATENT DOCUMENTS

| 2004/0267743 A1* | 12/2004 | Dasari | G06F 16/215 |
| 2013/0262313 A1* | 10/2013 | Martin | G06Q 40/00 |
| | | | 705/44 |
| 2014/0258246 A1* | 9/2014 | Lo Faro | G06Q 30/02 |
| | | | 707/692 |
| 2019/0236601 A1* | 8/2019 | Izenson | G06Q 20/322 |
| 2022/0076231 A1* | 3/2022 | Farrell | G06Q 20/34 |

OTHER PUBLICATIONS

Stripe, "Merchant ID: What merchant identification Nos. are, and how to find yours" Mar. 9, 2023 https://stripe.com/resources/more/merchant-id (Year: 2023).*

* cited by examiner

600

602 — Receive supply chain data

604 — Identify a party associated, via a supply chain, with an entity based at least in part on the supply chain data 606 — Collect additional data about the party 608 — Analyze the additional data about the party to determine a potential disruption to the entity 610 — Implement a corrective action to mitigate the potential disruption

ENTITY RESOLUTION AND CONSOLIDATION USING A UNIQUE IDENTIFIER

CROSS-REFERENCE TO RELATED APPLICATIONS

This application claims priority to U.S. Provisional Patent Application No. 63/455,693, filed Mar. 30, 2023, the entire contents of which are specifically incorporated by reference herein.

BACKGROUND

This disclosure generally relates to network data resolution and consolidation, and more particularly, to entity resolution and consolidation using a unique identifier for data with complex relationships gathered across a computer network from a plurality of sources.

A supply chain is a network of businesses, individuals, and activities that are involved in the creation and delivery of a product or service to an end customer. The process typically begins with the procurement of raw materials and ends with the delivery of a final product to the end customer.

A supply chain can have multiple phases. During a planning phase, it is determined what products will be produced, an amount of materials needed, a time frame for production, an approach for the distribution of finished products, and/or the like. During a source phase, raw materials and components are acquired from suppliers/vendors. During a manufacturing phase, the raw materials and components are used to manufacture the final product. After manufacturing, the final product is transported to other locations, such as warehouses or distribution centers during a logistics phase. The final step in the supply chain process is a distribution phase, which involves delivering the finished product to the customer, which can be accomplished using various channels, such as retailers, wholesalers, or direct to the consumer. The logistics phase and the distribution phase can involve various transportation methods, such as truck transport, rail transport, ship transport, and/or the like, including combinations and/or multiples thereof.

Throughout the supply chain process, there is a need for communication and coordination between different parties involved in the supply chain. This includes suppliers, manufacturers, logistics providers, transporters, and retailers.

SUMMARY

In one exemplary embodiment, a computer-implemented method for entity resolution and consolidation using a unique identifier is provided. The method includes receiving, by a processing device, supply chain data. The method also includes analyzing, by the processing device, the supply chain data to identify a unique entity and a doing business as (DBA) name associated with the unique entity. The method further includes generating, by the processing device, the unique identifier for the unique entity. The method additionally includes associating, by the processing device, the unique identifier with the unique entity and the DBA name associated with the unique entity and updating, by the processing device, the supply chain data to include the unique identifier for the unique entity and the DBA name associated with the unique entity.

In addition to one or more of the features described herein, or as an alternative, further embodiments of the method may include where the DBA name is one of a plurality of DBA names associated with the unique entity.

In addition to one or more of the features described herein, or as an alternative, further embodiments of the method may include where the unique identifier is a hash.

In addition to one or more of the features described herein, or as an alternative, further embodiments of the method may include where the hash is based at least in part on information about the unique entity.

In addition to one or more of the features described herein, or as an alternative, further embodiments of the method may include where the hash is based at least in part on a uniform resource locator associated with the unique entity.

In addition to one or more of the features described herein, or as an alternative, further embodiments of the method may include where the supply chain data includes global trade data, cyber data, and government spending data.

In addition to one or more of the features described herein, or as an alternative, further embodiments of the method may include where the supply chain data is received from a plurality of sources.

In addition to one or more of the features described herein, or as an alternative, further embodiments of the method may include performing a supply chain analysis using the supply chain data updated with the unique identifier, where the supply chain analysis identifies one or more potential risks associated with the unique entity.

In another exemplary embodiment a system includes a memory with computer readable instructions and a processing device for executing the computer readable instructions. The computer readable instructions controlling the processing device to perform operations including receiving supply chain data, analyzing the supply chain data to identify a unique entity and a doing business as (DBA) name associated with the unique entity, generating a unique identifier for the unique entity, associating the unique identifier with the unique entity and the DBA name associated with the unique entity, and updating the supply chain data to include the unique identifier for the unique entity and the DBA name associated with the unique entity.

In addition to one or more of the features described herein, or as an alternative, further embodiments of the system may include where the DBA name is one of a plurality of DBA names associated with the unique entity.

In addition to one or more of the features described herein, or as an alternative, further embodiments of the system may include where the unique identifier is a hash.

In addition to one or more of the features described herein, or as an alternative, further embodiments of the system may include where the hash is based at least in part on information about the unique entity.

In addition to one or more of the features described herein, or as an alternative, further embodiments of the system may include where the hash is based at least in part on a uniform resource locator associated with the unique entity.

In addition to one or more of the features described herein, or as an alternative, further embodiments of the system may include where the supply chain data includes global trade data, cyber data, and government spending data.

In addition to one or more of the features described herein, or as an alternative, further embodiments of the system may include where the supply chain data is received from a plurality of sources.

In addition to one or more of the features described herein, or as an alternative, further embodiments of the system may include where the computer readable instructions controlling the processing device are further configured to perform operations including performing a supply chain analysis using the supply chain data updated with the unique identifier, where the supply chain analysis identifies one or more potential risks associated with the unique entity.

In yet another exemplary embodiment a computer program product includes a computer readable storage medium having program instructions embodied therewith, where the computer readable storage medium is not a transitory signal per se, the program instructions executable by a processing device to cause the processing device to perform operations for entity resolution and consolidation using a unique identifier. The operations include receiving supply chain data, analyzing the supply chain data to identify a unique entity and a doing business as (DBA) name associated with the unique entity, generating a unique identifier for the unique entity, associating the unique identifier with the unique entity and the DBA name associated with the unique entity, and updating the supply chain data to include the unique identifier for the unique entity and the DBA name associated with the unique entity.

In addition to one or more of the features described herein, or as an alternative, further embodiments of the computer program product may include where the DBA name is one of a plurality of DBA names associated with the unique entity, the unique identifier is a hash, and the hash is based at least in part on information about the unique entity and/or a uniform resource locator associated with the unique entity.

In addition to one or more of the features described herein, or as an alternative, further embodiments of the computer program product may include where the supply chain data includes global trade data, cyber data, and government spending data.

In addition to one or more of the features described herein, or as an alternative, further embodiments of the computer program product may include where the program instructions executable by the processor to cause the processor to further perform operations including performing a supply chain analysis using the supply chain data updated with the unique identifier, where the supply chain analysis identifies one or more potential risks associated with the unique entity, and where the supply chain data is received from a plurality of sources.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
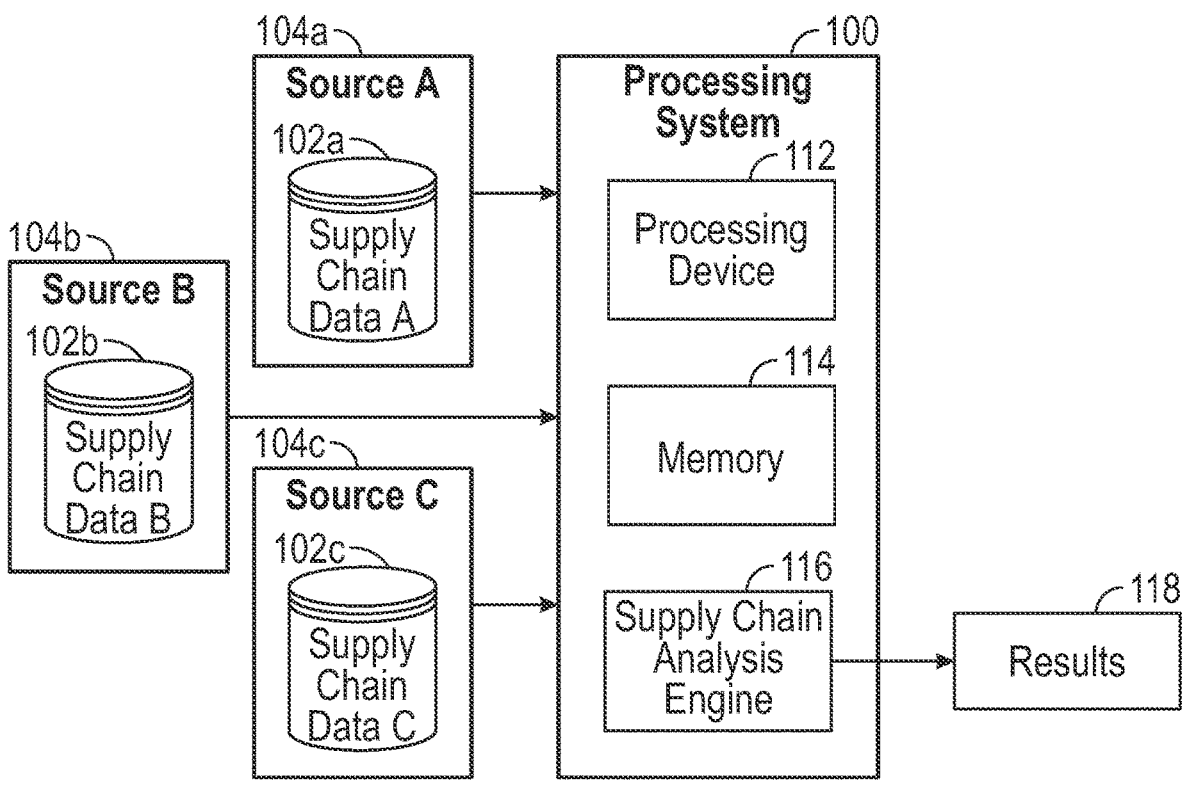
FIG. 1 depicts a block diagram of a processing system for analyzing supply chains according to one or more embodiments described herein.

The diagrams depicted herein are illustrative. There can be many variations to the diagram or the operations described therein without departing from the scope of the embodiments described herein. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments described herein relate to analyzing supply chains and, more particularly, to a unique identifier for entity resolution and consolidation. A supply chain is a network of businesses, individuals, and activities that are involved in the creation and delivery of a product or service to an end customer. The process typically begins with the procurement of raw materials and ends with the delivery of a final product to the end customer.

A supply chain may be susceptible to events that can cause disruptions to the supply chain. For example, supply chains can face cyber threats, financial threats, fraud, and other risks, which may disrupt an organization's business practices. It may be beneficial to analyze data relating to entities that make up a supply chain network for an organization in order to understand and mitigate these risks. Non-limiting examples of risks include one or more of the following: operation risks (e.g., locations and geopolitical risks, labor issue reporting, software integrity); environmental, social, and governance risks (e.g., environmental controversies, non-harmful products and quality products, safe labor practices, modern slavery, compliance with laws and regulations, information security, human rights, business with high-risk countries, supply chain oversight); foreign ownership, control, and influence risks (e.g., state ownership; locations; dominating markets, customers, and suppliers); reputational, criminal, and regulatory risks (e.g., watchlists, trade restriction lists, criminal records, debarment lists, sanctions lists); and/or the like, including combinations and/or multiples thereof. An organization may interface with many (e.g., 10,000+) third parties in a given year as part of the organization's supply chain network. As such, the amount of third-party data to be analyzed is significant and difficult to analyze. Processing of the data cannot be performed directly by humans, as the underlying data can change faster than a human can process the data. Moreover, supply chains face growing global regulatory compliance issues, such as jurisdictional regulations or laws, which can lead to fines or sanctions for an organization that fails to comply.

Rather than actively monitoring data sources for changes and pulling selected data sets, embodiments as further described herein can perform continuous monitoring with a passive approach. For example, data attributes such as entity-related data, shipping-related data, and risk-related data can exist in multiple data streams with different, asynchronous update rates. According to embodiments, a data structure can be created that automatically generates unique identifiers to link multiple source data sets from the data sources as normalized dynamic data streams. As data feeds from multiple data sources are updated, associations identified with entities can flow through inheritance properties for use such that the latest data updates are already available to report in response to a subsequent user query. This differs from approaches that wait for a user query before searching data sources in an attempt to find matching values each time on demand.

As an example, embodiments can perform data set and logic rebuilds at a regular interval, such as nightly, to ingest large data sets and populate records through passive inheritance relationships such that a fully populated collection of data associated with predefined qualities or attributes is available for immediate use. This can result in an idempotent solution that rapidly returns results in response to subsequent queries to avoid repeated search requests of multiple data sources when the same or similar sets of queries are repeated. Linkage of attributes can include multi-directional pointers to associate data across multiple dimensions. For instance, a data source may identify a location of an entity, such as a company, at a particular geographic location. Another data source may track the movement of goods through a shipping port in close geographic proximity to the company. When a data source indicates a potential issue related to the movement of goods through the shipping port, a shipping risk (e.g., a delay or inability to ship through the port) can be identified for the company even though the data source providing port information did not directly identify the company. Associations can have various levels of confidence depending on whether a direct statement is included in the data or whether the linkage is inferred through one or more pieces of evidence. Furthermore associations can be defined in a hierarchy across multiple levels of related entities, subsidiaries, and supply chain dependencies.

Systems, such as the processing system 100 of FIG. 1, provide for analyzing supply chains according to one or more embodiments described herein. The processing system 100 receives supply chain data (e.g., supply chain data A 102a, supply chain data B 102b, supply chain data C 102c (collectively referred to as "supply chain data 102")) from multiple sources (e.g., source A 104a, source B 104b, source C 104c (collectively referred to as "sources 104")). The sources 104 can collect and aggregate data about different entities (e.g., suppliers, shippers, vendors, third-parties, and/or the like, including combinations and/or multiples thereof). Non-limiting examples of the supply chain data 102 can include one or more of the following: federal contracting, purchasing, and spending data; open source data; commerce, shipping, and corporate data; processes data (e.g., resume data, job posting data, social networks, white papers, government documents, investor presentation, news, blogs, and/or the like, including combinations and/or multiples thereof). Thus, the scope of the data extends far beyond direct reporting about entities to include an aggregation of source data from which inferences can be made.

The supply chain data 102 from the different sources 104 can include the same or different types of information, the same or different formats of data, and/or the like, including combinations and/or multiples thereof. For example, the supply chain data A 102a can be in a first format and can include a first type of information (e.g., global trade data); the supply chain data B 102b can be in a second format and can include a second type of information (e.g., cyber data); and the supply chain data C 102c can be in a third format and can include a third type of information (e.g., governmental spending data). The different sources 104 may have different security and access constraints, be located on various servers distributed across multiple geographic locations, and have different update rates.

The processing system 100 analyzes the supply chain data 102 using a supply chain analysis engine 116 to understand and mitigate risks to an organization's supply chain by generating results 118. For example, the processing system 100 can identify supply chain networks, analyze trends, analyze trade relationships, mitigate business risks, assess different types of risks, and/or the like, including combinations and/or multiples thereof. Non-limiting examples of tasks the supply chain analysis engine 116 can perform are as follows: data parsing and cleaning, machine-learned curation, pattern matching, natural language processing, analytics, entity resolution, mashing and integration, and/or the like, including combinations and/or multiples thereof. Other non-limiting examples of tasks the supply chain analysis engine 116 can perform are as follows: product installation confirmation, bill of lading information, product naming normalization, product-to-company-location confirmation, data enrichment, record creation, according to one or more embodiments described herein. The supply chain analysis engine 116 can, alternatively or additionally, assist with quality assurance processing by supporting verifying shipping documents, supporting human resolution of statistically relevant samples, supporting independent phone surveys for verification, and/or the like, including combinations and/or multiples thereof.

The various components, modules, engines, etc. described regarding FIG. 1 (e.g., the supply chain analysis engine 116) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 112 for executing those instructions. Thus, a system memory (e.g., memory 114) can store program instructions that when executed by the processing device 112 implement the engines described herein. Other engines can also be utilized to include other features and functionality described in other examples herein.

In one or more embodiments, the supply chain analysis engine 116 can be implemented on the processing system 100 of FIG. 1. However, in one or more other embodiments, the supply chain analysis engine 116 can be implemented, in whole or in part, using a cloud computing system (not shown). Cloud computing can supplement, support or replace some or all of the functionality of the elements of the processing system 100. Additionally, some or all of the functionality of the elements of the processing system 100 can be implemented as a cloud node of a cloud computing system (see, e.g., FIG. 3).

Figure 2A:
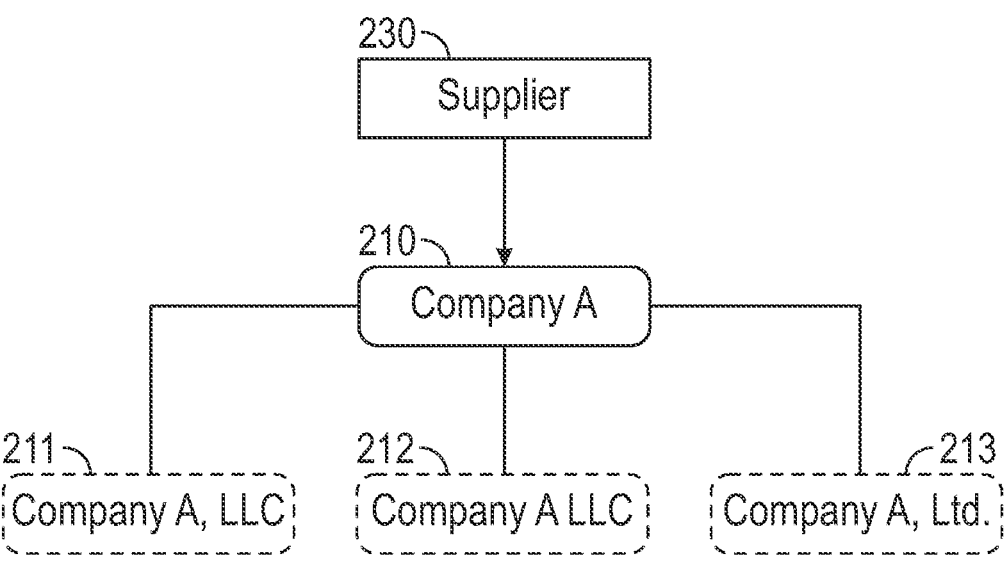
FIGS. 2A and 2B depict entities having "doing business as" names according to one or more embodiments described herein.
Figure 2B:
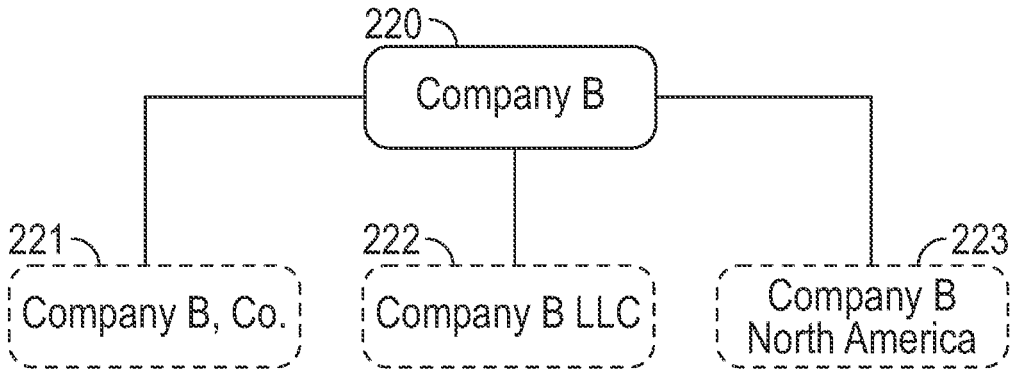

In some cases, the entities referenced in the supply chain data 102 relate to different legal entities, as shown in FIGS. 2A and 2B. Particularly, FIGS. 2A and 2B depict two embodiments according to one or more embodiments described herein, namely Company A 210 and Company B 220 respectively. However, sometimes, a single legal entity uses or is known by different names, known as "doing business as" ("DBA"). For example, with reference to FIG. 2A, Company A 210 may do business as, or otherwise be referred to as, the following names: "Company A, LLC" 211; "Company A LLC" 212; and/or "Company A, Ltd." 213. Each of these names refers to the same legal entity "Company A." It should be appreciated that the different DBA names for Company A 210 do not represent discrete legal entities. As shown in FIG. 2B, Company B 220 may do business as, or otherwise be referred to as, the following names: "Company B, Co." 221 and/or "Company B LLC" 222. In this example, "Company B North America" 223 is not a DBA but rather is a subsidiary of Company B 220. It should be appreciated that the structures of entities in FIGS. 2A and 2B are merely provided as examples and should not be construed to limit the claims.

According to one or more embodiments described herein, Company A 210 can be supplied by a supplier 230, which may be any suitable vendor. Additional parties (not shown) may be in the supply chain between Company A 210 and the supplier 230 according to one or more embodiments described herein.

With continued reference to FIG. 1, the supply chain data 102 can reference one or more of the DBA names for a company. Consequently, it can be difficult to identify unique entities within the supply chain data 102 because many of the entities are referenced by DBA names. For example, one unique entity (e.g., Company A 210) may be included within the data by multiple different DBA names (e.g., "Company A, LLC" 211; "Company A LLC" 212; and/or "Company A, Ltd." 213) even though each refers to the same entity (e.g., Company A 210). When the supply chain analysis engine 116 analyses the supply chain data 102, it is useful to screen the data for a single legal entity together. Thus, it is useful to perform entity resolution and consolidation to identify DBA names and associate them with a single legal entity.

In an effort to address these and other shortcomings, one or more embodiments described herein provide for identifying different DBA names for a single legal entity, grouping the DBA names for that single legal entity together, and assigning a unique identifier to each unique entity inclusive of the DBA names for that entity, while avoiding incorrect identification of a subsidiary as the same entity.

Figure 3:
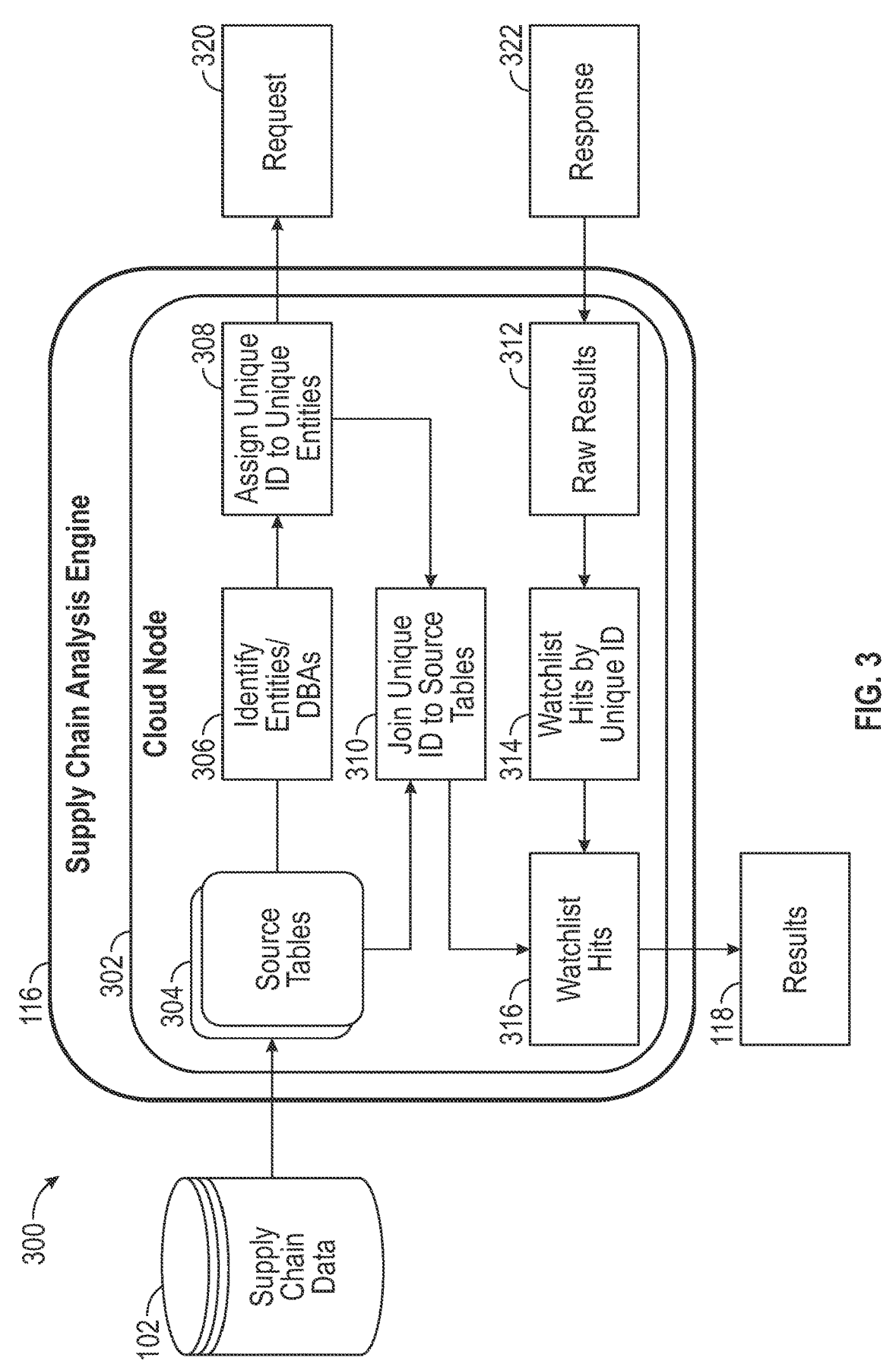
FIG. 3 depicts a system for entity resolution and consolidation using a unique identifier according to one or more embodiments described herein.

Turning now to FIG. 3, a system 300 is depicted for entity resolution and consolidation using a unique identifier according to one or more embodiments described herein. In the example of FIG. 3, the supply chain analysis engine 116 of FIG. 1 is embodied as a cloud node 302 of a cloud computing system (not shown) but is not so limited. The cloud node 302 can use one or more processing devices and memory resources from a cloud computing system, where the precise location of the processing devices and memory resources need not be known and can be dynamically allocated, used, and released as driven by processing and storage demands.

The supply chain analysis engine 116 receives supply chain data 102 (e.g., the (e.g., supply chain data A 102*a*, supply chain data B 102*b*, supply chain data C 102*c*). The supply chain data 102 can be received from different sources 104 as in FIG. 1. Each of the supply chain data A 102*a*, supply chain data B 102*b*, supply chain data C 102*c* can include data about entities, including DBA names. As described herein, the supply chain data 102 from the different sources 104 can include the same or different types of information, the same or different formats of data, and/or the like, including combinations and/or multiples thereof. For example, the supply chain data A 102*a* can be in a first format and can include a first type of information (e.g., global trade data); the supply chain data B 102*b* can be in a second format and can include a second type of information (e.g., cyber data); and the supply chain data C 102*c* can be in a third format and can include a third type of information (e.g., government spending data). It should be appreciated that the supply chain data 102 is voluminous. As an example, the supply chain data 102 can include billions of data points; consequently, analyzing the supply chain data 102 cannot practically be performed in the human mind.

The supply chain analysis engine 116 stores the supply chain data 102 in source tables 304, which could be tables of a relational database, for example, or other such data structures. The supply chain analysis engine 116 then identifies unique entities and DBA names at block 306. To do this, the supply chain analysis engine 116 analyzes the supply chain data 102 to identify entities with the same or similar names. The supply chain analysis engine 116 uses the supply chain data 102 to identify different DBA names and groups them together. For example, the supply chain analysis engine 116 can analyze invoice data and understand that a single legal entity (e.g., Company A 210) issues invoices using DBA names "Company A, LLC" 211; "Company A LLC" 212; and/or "Company A, Ltd." 213. The supply chain analysis engine 116 can compare information about the DBA names (e.g., address information, corporate registration information, etc.) to determine that the DBA names are, in fact, DBA names that relate to the Company A 210 and are not unique entities.

At block 308, the supply chain analysis engine 116 assigns a unique identifier to each unique entity inclusive of the DBA names for that entity from block 306. In one example, a proprietary hash can be created as the unique identifier using information about the entity and/or DBA names. As an example, a standardize format uniform resource locator (URL) associated with the unique entity can be hashed to generate the unique identifier. Using a standardized format URL (e.g., "companyA.com") is one of the many unique identifiers that can be hashed in order to create the unique identifier, for example. Other items that can be used as unique identifiers include, for example, data universal numbering system (DUNS) numbers, unique entity identifiers (UEIs), commercial and government entity (CAGE) codes, universal product codes (UPCs), service set identifiers, internet protocol addresses, and/or other unique identifiers known in the art. According to one or more embodiments described herein, an algorithmic selection can be used to determine which DBA to treat a primary DBA (e.g., based on number of occurrences, most recent occurrence, etc.). Where more than one unique identifier is available, embodiments can use priority-based selection to select the unique identifier with a highest degree of confidence as being unique for deriving a hashed unique identifier. This approach can allow many different potential unique identifiers to be used collectively with a unique and compact format of identification. For instance, where the unique identifier is text-based, the hashed format can effectively compress the identifier to reduce storage requirements while remaining unique. In some aspects, where identifier tuples exist, a unique identifier can be derived based on the combination of identifiers, which can be a weighted combination.

At block 310, the unique identifier can be added to the supply chain data 102 to join the unique identifier to the source tables 304. The join can be performed using any suitable database join technique, such as an inner join, an outer join, a cross-join, and/or the like, including combinations and/or multiples thereof.

The unique identifier can be used for screening, for example, by sending a request 320 to a screening service (not shown). The screening service can return a response 322 as a percentage matching a watchlist score for the entity based on the unique identifier. The supply chain analysis engine 116 can store the response 322 as raw results 312. The supply chain analysis engine 116 can count a number of watch list occurrences (e.g., "hits") that occur for the unique identifier at block 314. The percentage can be compared to a threshold (e.g., 0.50), for example, for identifying issues associated with the entity having the unique identifier at block 316. For example, no issues may be considered to exist if the percentage is less than the threshold. However, when the threshold is satisfied (e.g., met or exceeded) the supply chain analysis engine 116 can generate results 118. The results 118 may identify the unique identifier of the entity for which the watchlist occurrences satisfied the threshold as well as information about the entity, information about why the alert occurred, and/or any other suitable information. According to one or more embodiments described herein, the results 118 can include a recommendation for an alternative supplier/vendor. In some aspects, data structures can be defined down to an entity, industry, and location level with passive inheritance used to link the unique identifier to the data stream and roll up associations to primary records with normalized identifiers applied across data sets. Pre-mapping can allow risks to be passed through continuous passive inheritance to stream data content to an identifier structure rather than performing a delta/difference analysis to determine which records have changed and need an update. This approach can avoid manual intervention for conflicting or ambiguous records by performing frequent full rebuilds to ensure that newly derived data is available when a user logs in. By having records for a user prebuilt/ rebuilt based on scheduled actions, search times can be reduced and repetitive/redundant searches can be avoided.

Figure 4:
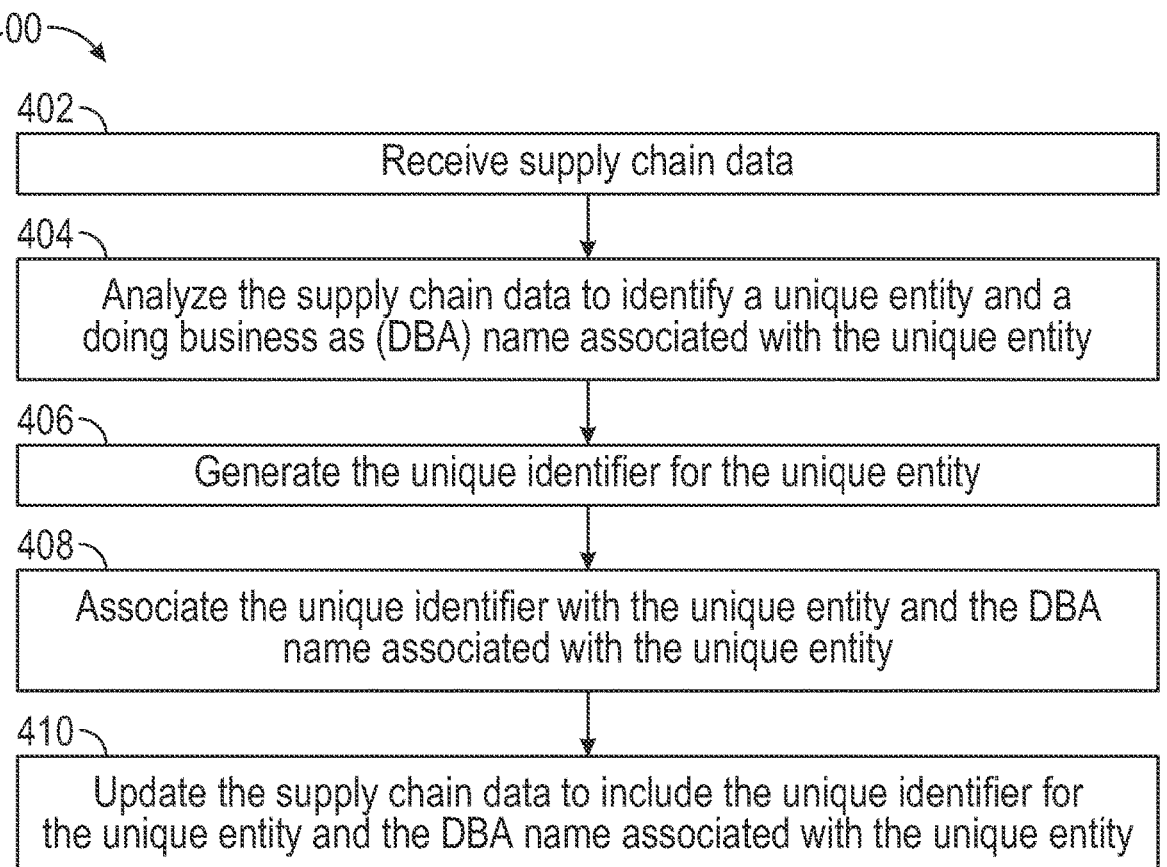
FIG. 4 is a flow diagram of a method for entity resolution and consolidation using a unique identifier according to one or more embodiments described herein.

FIG. 4 is a flow diagram of a method 400 for entity resolution and consolidation using a unique identifier according to one or more embodiments described herein. The method 400 can be implemented by any suitable device or system, such as the processing system 100 of FIG. 1, the system 300 of FIG. 3, and/or the processing system 700 of FIG. 7 as a computer-implemented method. The method 400 is now described with reference to the system 300 of FIG. 3 but is not so limited.

At block 402, the supply chain analysis engine 116 of the system 300 receives the supply chain data 102. The supply chain data 102 can be received from a single source or a plurality of sources (e.g., the sources 104 of FIG. 1). According to one or more embodiments described herein, the supply chain data 102 can include global trade data, cyber data, and/or government spending data.

At block 404, the supply chain analysis engine 116 of the system 300 analyzes the supply chain data to identify a unique entity and a DBA name associated with the unique entity. According to one or more embodiments described herein, the DBA name is one of a plurality of DBA names associated with the unique entity. That is, the unique entity can have one or multiple DBA names associated therewith.

At block 406, the supply chain analysis engine 116 of the system 300 generates the unique identifier for the unique entity. For example, at block 308 of the system 300, the supply chain analysis engine 116 generates the unique identifier. According to one or more embodiments described herein, the unique identifier is a hash. According to one or more embodiments described herein, the hash is based at least in part on information about the unique entity. According to one or more embodiments described herein, the hash is based at least in part on a uniform resource locator associated with the unique entity.

At block 408, the supply chain analysis engine 116 of the system 300 associates the unique identifier with the unique entity and the DBA name associated with the unique entity. For example, at block 308 of the system 300, the supply chain analysis engine 116 assigns the unique identifier to the unique entity.

At block 410, the supply chain analysis engine 116 of the system 300 updates the supply chain data (e.g., metadata associated with supply chain data 102) to include the unique identifier for the unique entity and the DBA name associated with the unique entity. For example, at block 310 of the system 300, the supply chain analysis engine 116 joins the unique identifier to the source tables 304 storing the supply chain data 102.

Additional processes also may be included. According to one or more embodiments described herein, the method 400 includes performing a supply chain analysis using the supply chain data 102 updated with the unique identifier. The supply chain analysis identifies potential risks (e.g., cyber threats, financial threats, fraud, and/or the like, including combinations and/or multiples thereof) associated with the unique entity. It should be understood that the process depicted in FIG. 4 represents an illustration, and that other processes may be added or existing processes may be removed, modified, or rearranged without departing from the scope of the present disclosure.

The unique identifier created as described herein can be used when analyzing supply chain data. For example, the processing system 100 of FIG. 1 can use the unique identifier to generate the results 118 based on the supply chain data 102. For example, the supply chain analysis engine 116 can use the unique identifier to generate enriched commerce data from global trade data, enriched cyber data from cyber data, and enriched contracts data from government spending data.

The commerce data identifies shipping information such as ports, shipping containers, identification of transport from one port to another, descriptions of contents of containers, harmonized system (HS) code data, company information (e.g., shipper and consignee), and/or the like, including combinations and/or multiples thereof. The cyber data describes software usage, such as which particular software applications are being used at which entities.

For the commerce and cyber data, it may not be evident how parties farther up or down the supply chain may be impacted or may be impacting the shipper and/or consignee. For example, with reference to FIG. 2A, a supplier 230 to Company A 210 may use a software application for managing a portion of its business. The software application may be known to be defective (e.g., a new version is release that includes undesirable effects, the software has malicious code, and/or the like, including combinations and/or multiples thereof). As a result, the use of the software application by the supplier 230 may cause disruptions to the operation of the supplier 230, which may in turn cause disruptions to the operation of Company A 210. It should be appreciated that the supplier 230 may be a direct supplier to Company A 210 or may be farther up the supply chain relative to Company A 210. Thus, it may not be readily apparent that a disruption to the supplier 230 may negatively impact Company A 210.

According to one or more embodiments described herein, a multitier approach is provided that identifies the parties farther up the supply chain (e.g., farther up from a shipper) and farther down the supply chain (e.g., farther down from a consignee). For example, in the case of cyber data, one or more embodiments can crawl and scrape publicly available information (e.g., online entity information, job postings, resumes, etc.) associated with a party (e.g., a vendor, supplier, etc.). Using this information, it can be determined which particular software applications are being used at which entities up and down the supply chain. Then, when a new software vulnerability arises, for example, the parties in the supply chain that use that software can be identified. This can enable identifying potential impacts to the shipper and/or consignee.

Figure 5:
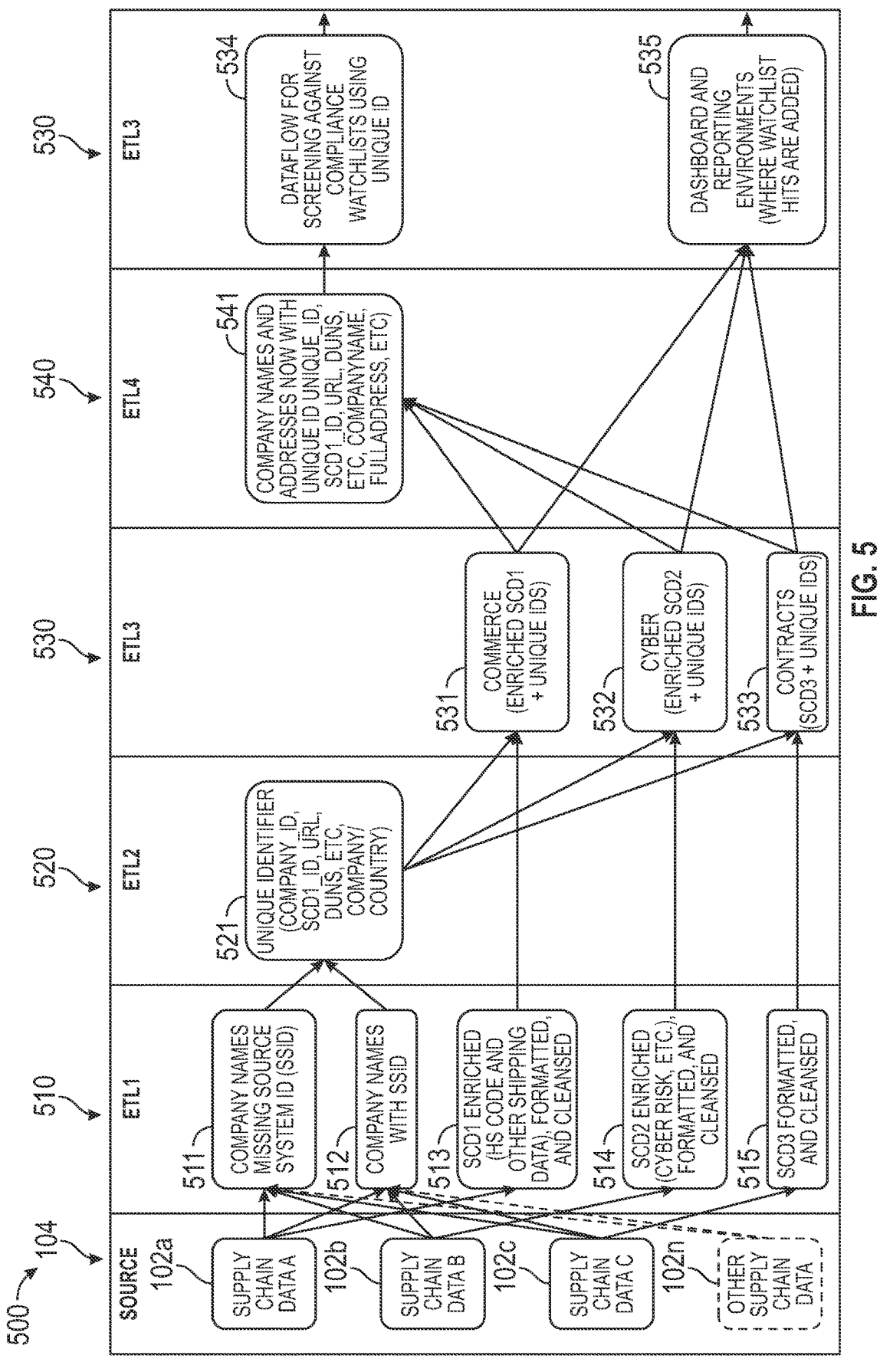
FIG. 5 is a flow diagram of a method for analyzing supply chain data using a unique identifier according to one or more embodiments described herein.

FIG. 5 is a flow diagram of a method 500 for analyzing supply chain data using a unique identifier according to one or more embodiments described herein. The method 500 can be implemented by any suitable device or system, such as the processing system 100 of FIG. 1, the system 300 of FIG. 3, and/or the processing system 700 of FIG. 7 as a computer-implemented method. The method 500 is now described with reference to the system 300 of FIG. 3 but is not so limited.

Sources 104 provide supply chain data 102 as supply chain data A 102*a* (e.g., global trade data), supply chain data B 102*b* (e.g., cyber data), supply chain data C 102*c* (e.g., government spending data), and other supply chain data 102*n*. The supply chain data 102 is then passed into a first phase 510 of the method 500. The method 500 includes multiple extract, transform, load (ETL) phases 510, 520, 530, 540. The ETL phases 510, 520, 530, 540 provide for extracting information from the supply chain data 102, transforming the data, and loading the data for subsequent phases.

The supply chain data 102 are fed into ETL phase 510. Block 511 represents company (e.g., entity) names that are missing a source system identifier (SSID). Block 512 represents company (e.g., entity) names that include an SSID. The SSID is an identifier is used to specify unique records. Block 513 represents the supply chain data A 102*a* being enriched (e.g., added HS code and shipping information), formatted, and cleansed. Similarly, block 514 represents the supply chain data B 102*b* being enriched, formatted, and cleansed. Block 515 represents the supply chain data C 102*c* being formatted and cleansed. As described with reference to FIG. 6, enriching the data can include crawling and scraping publicly available information to supplement the supply chain data 102.

With continued reference to FIG. 5, the data from the phase 510 is then passed to phases 520 and 530 as shown. Particularly, the data from block 511 and 512 is passed to block 521 of phase 520. Block 521 represents the unique identifiers (IDs) (e.g., company_ID, URL, data universal numbering system (DUNS) number, company, country, and/or the like, including combinations and/or multiples thereof).

At phase 530, data is received from phase 510 and 520 as shown. Particularly, the company IDs from block 521 are passed to block 531, 532, and 533, which respectively represent commerce data, cyber data, and contracts data. Block 531 also receives data from block 513, block 532 also receives data from block 514, and block 533 also receives data from block 515. Block 531 combines the enriched supply chain data A from block 513 with the unique identifier from block 521. Block 532 combines the enriched supply chain data B from block 514 with the unique identifier from block 521. Block 533 combines the formatted and cleansed data from block 515 with the unique identifier from block 521.

Blocks 531, 532, and 533 each feed into block 541 of phase 540 and into blocks 534 and 535 of phase 530. Block 541 of phase 540 combines company names and addresses with the respective unique identifier for a unique entity. This can be done, for example, based on the unique identifier, an identifier for the supply chain data A from block 513, the URL, DUNS number, company name, full address, and/or the like, including combinations and/or multiples thereof. Block 534 of phase 530 represents a dataflow for screening against compliance watchlists using the unique identifier. That is, the unique identifier can be fed into compliance watchlists to determine whether the entity associated with the unique identifier (e.g., the legal entity and any associated DBA names) are on any compliance watchlists. Block 535 of phase 530 represents dashboard and reporting environments where watchlist hits (e.g., resulting from block 534) are generated. The dashboard and reporting environments can be implemented as user interfaces on any suitable device (e.g., smartphone, laptop, and/or the like, including combinations and/or multiples thereof).

Additional processes also may be included, and it should be understood that the process depicted in FIG. 5 represents an illustration, and that other processes may be added or existing processes may be removed, modified, or rearranged without departing from the scope of the present disclosure.

Figure 6:
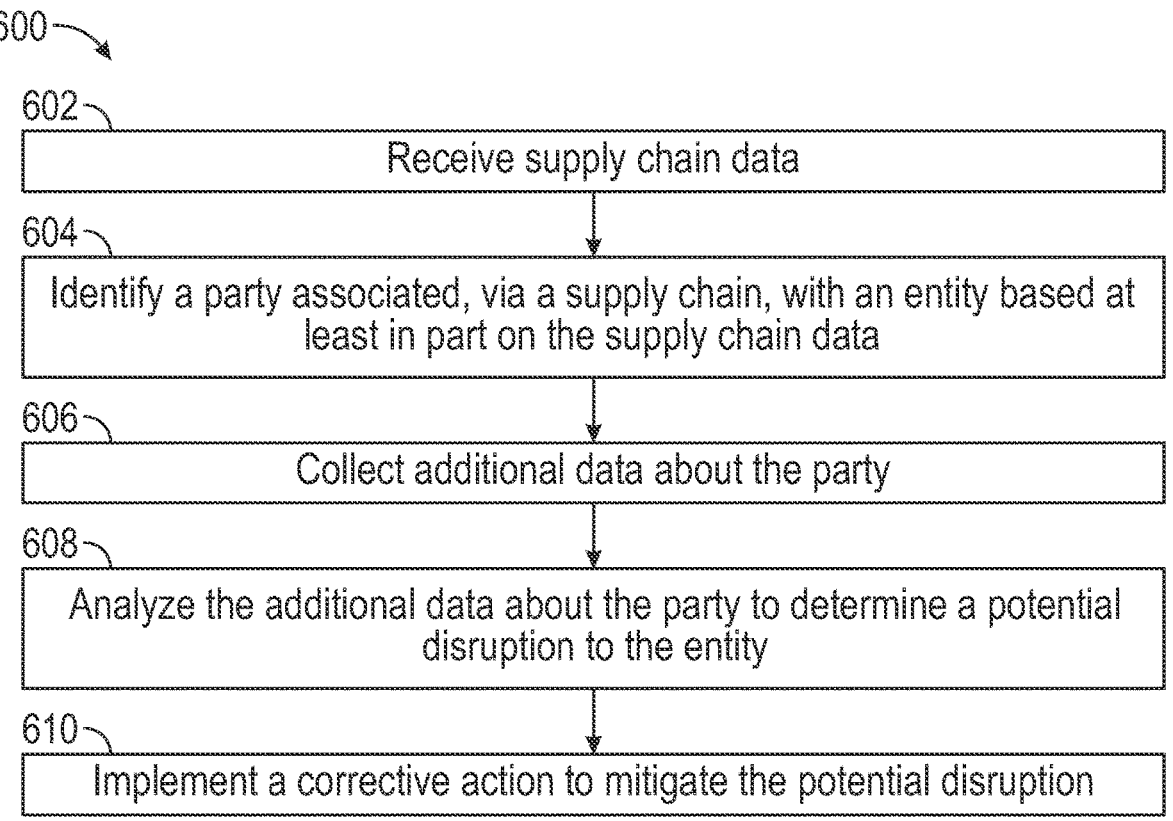
FIG. 6 is a flow diagram of a method for enriching supply chain data using a unique identifier according to one or more embodiments described herein.

FIG. 6 is a flow diagram of a method 600 for enriching supply chain data according to one or more embodiments described herein. The method 600 can be implemented by any suitable device or system, such as the processing system 100 of FIG. 1, the system 300 of FIG. 3, and/or the processing system 700 of FIG. 7 as a computer-implemented method. The method 600 is now described with reference to the system 300 of FIG. 3 but is not so limited.

At block 602, the supply chain analysis engine 116 of the system 300 receives the supply chain data 102. The supply chain data can be received from a single source or a plurality of sources (e.g., the sources 104 of FIG. 1). According to one or more embodiments described herein, the supply chain data can include global trade data, cyber data, and/or government spending data.

At block 604, the supply chain analysis engine 116 of the system 300 identifies a party (e.g., the supplier 230) associated, via a supply chain, with an entity (e.g., Company A 210) based at least in part on the supply chain data. According to one or more embodiments described herein, identifying the party can be performed using a unique identifier for the entity, as described herein (see, e.g., FIG. 4). According to one or more embodiments described herein, the unique identifier is a hash. According to one or more embodiments described herein, the hash is based at least in part on information about the unique entity. According to one or more embodiments described herein, the hash is based at least in part on a uniform resource locator associated with the unique entity.

At block 606, the supply chain analysis engine 116 of the system 300 collects additional data about the party. According to one or more embodiments described herein, the additional data can be commerce data relating to the party. As an example, the commerce data identifies one or more of a port, a shipping container, a transport from the port to another port, contents of the container, harmonized system code data, and/or company information about a shipper and a consignee. According to one or more embodiments described herein, the additional data can be cyber data relating to the party. For example, the cyber data identifies software usage of the party (e.g., what software applications the supplier 230 is using). According to one or more embodiments described herein, collecting the additional data about the party includes crawling and scraping publicly available information (e.g., online entity information, job postings, resumes, etc.) associated with the party.

At block 608, the supply chain analysis engine 116 of the system 300 analyzes the additional data about the party to determine a potential disruption to the entity. For example, where the additional data is commerce data, the supply chain analysis engine 116 can determine whether the supplier 230 is experiencing shipping delays (e.g., delays receiving or delivering goods/services). As another example, where the additional data is cyber data, the supply chain analysis engine 116 can determine whether the supplier 230 is using a software application that is problematic (e.g., malicious code, unstable, and/or the like, including combinations and/or multiples thereof). These and other examples are possible.

At block 610, a corrective action can be implemented to mitigate the potential disruption. According to one or more embodiments described herein, the corrective action can include selecting an alternative party (e.g., select a different supplier), adjusting an operation of the entity (e.g., change a production timeline, changing a shipping method), and/or the like, including combinations and/or multiples thereof.

Additional processes also may be included, and it should be understood that the process depicted in FIG. 6 represents an illustration, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide a unique identifier for analyzing supply chain data. Due to the volume of data points in supply chain data (e.g., billions of data points), it is difficult to determine which entities are unique and which are merely DBA names of other entities. One or more embodiments described herein provide for identifying unique entities and associated a unique identifier with the unique entity and any associated DBA name(s). This provides for analyzing supply chain data by entity in a more efficient and effective way. For example, where multiple compliance "hits" arise for multiple DBA names, each of the individual DBA names may not have enough "hits" to trigger a watchlist warning. However, when considered collectively, the DBA names relating to a single unique entity may trigger a watchlist warning in the aggregate. These aspects of the disclosure constitute technical features that yield the technical effect of analyzing supply chain data in an efficient and effective way that cannot practically be performed in the human mind. As a result of these technical features and technical effects, entity resolution and consolidation using a unique identifier in accordance with example embodiments of the disclosure represents an improvement to supply chain data analysis techniques. It should be appreciated that the above examples of technical features, technical effects, and improvements to technology of example embodiments of the disclosure are merely illustrative and not exhaustive.

Figure 7:
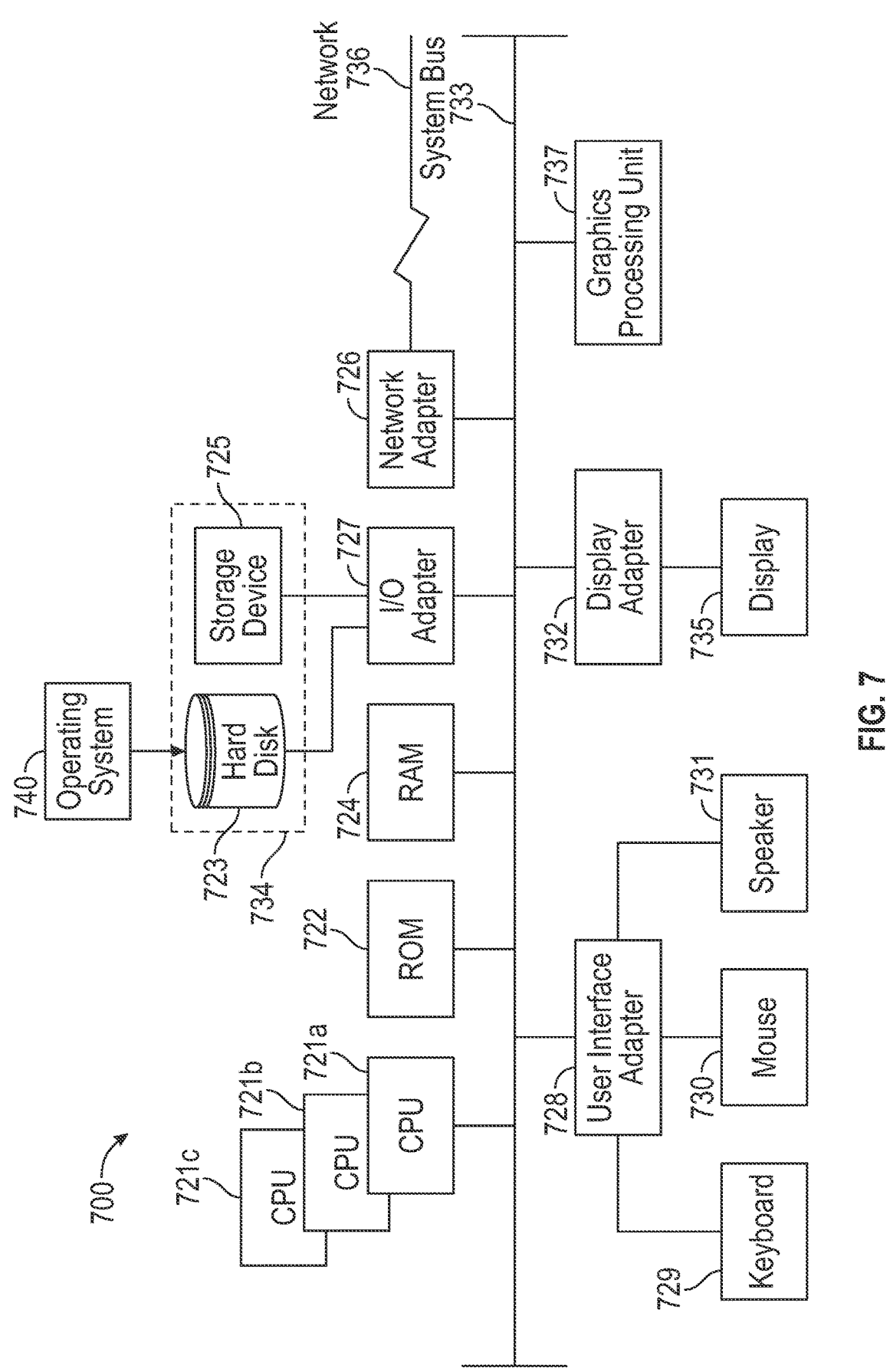
FIG. 7 depicts a block diagram of a processing system for implementing one or more embodiments described herein.

It is understood that one or more embodiments described herein is capable of being implemented in conjunction with any other type of computing environment now known or later developed. For example, FIG. 7 depicts a block diagram of a processing system 700 for implementing the techniques described herein. In accordance with one or more embodiments described herein, the processing system 700 is an example of a cloud node 302 of FIG. 3. In examples, processing system 700 has one or more central processing units ("processors" or "processing resources" or "processing devices") 721a, 721b, 721c, etc. (collectively or generically referred to as processor(s) 721 and/or as processing device (s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display 735 (e.g., a display monitor) is connected to system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 may be interconnected to system bus 733 via user interface adapter 728, which may include, for example, a Super I/O chip integrating multiple device adapters into a single integrated circuit.

In some aspects of the present disclosure, processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in processing system 700.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

The flowchart and block diagrams in the figures illustrate the architecture, functionality, and operation of possible implementations of systems, methods, and computer program products according to various embodiments described herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for entity resolution and consolidation using a unique identifier, the method comprising:

receiving, by a processing device, supply chain data from a plurality of data sources distributed across a network;

analyzing, by the processing device, the supply chain data to identify an entity and a doing business as (DBA) name associated with the entity;

generating, by the processing device, the unique identifier for the entity;

identifying, by the processing device, a second DBA name associated with a second entity in the supply chain data;

comparing, by the processing device, information about the DBA name and the second DBA name to determine whether the DBA name and the second DBA name are both associated with a same entity;

grouping, by the processing device, the second DBA name and the second entity with the DBA name and the entity based on determining that the DBA name and the second DBA name are both associated with the same entity as a unique entity;

associating, by the processing device, the unique identifier with the unique entity, the DBA name associated with the unique entity, and the second DBA name associated with the unique entity;

creating, by the processing device, a data structure with a plurality of unique identifiers including the unique identifier to link multiple source data sets from the data sources as normalized dynamic data streams;

flowing, by the processing device, updates from the source data sets based on data feeds of the data sources to the data structure through inheritance properties such that the updates are available at a predetermined interval;

updating, by the processing device, the data structure to include the DBA name associated with the unique entity, and the second DBA name associated with the unique entity, thereby providing entity resolution and consolidation using the unique identifier.

2. The computer-implemented method of claim 1, wherein the DBA name is one of a plurality of DBA names associated with the unique entity.

3. The computer-implemented method of claim 1, wherein the unique identifier is a hash and is determined as part of a multi-phase process comprising a plurality of extract, transform, and load (ETL) phases, and wherein separate processing of entities having a source system identifier and missing the source system identifier is performed in one of the ETL phases prior to processing the unique identifier in a subsequent one of the ETL phases.

4. The computer-implemented method of claim 3, wherein the hash is based at least in part on information about the unique entity.

5. The computer-implemented method of claim 3, wherein the hash is based at least in part on a uniform resource locator associated with the unique entity.

6. The computer-implemented method of claim 1, wherein the supply chain data comprises global trade data, cyber data, and government spending data.

7. The computer-implemented method of claim 1, further comprising performing a supply chain analysis using the supply chain data updated with the unique identifier, wherein the supply chain analysis identifies one or more potential risks associated with the unique entity.

8. A system comprising:

a memory comprising computer readable instructions; and a processing device for executing the computer readable instructions, the computer readable instructions controlling the processing device to perform operations comprising:

receiving supply chain data from a plurality of data sources distributed across a network;

analyzing the supply chain data to identify an entity and a doing business as (DBA) name associated with the entity;

generating a unique identifier for the entity;

identifying a second DBA name associated with a second entity in the supply chain data;

comparing information about the DBA name and the second DBA name to determine whether the DBA name and the second DBA name are both associated with a same entity;

grouping the second DBA name and the second entity with the DBA name and the entity based on determining that the DBA name and the second DBA name are both associated with the same entity as a unique entity;

associating the unique identifier with the unique entity, the DBA name associated with the unique entity, and the second DBA name associated with the unique entity;

creating a data structure with a plurality of unique identifiers including the unique identifier to link multiple source data sets from the data sources as normalized dynamic data streams;

flowing updates from the source data sets based on data feeds of the data sources to the data structure through inheritance properties such that the updates are available at a predetermined interval; and updating the data structure to include the DBA name associated with the unique entity, and the second DBA name associated with the unique entity, thereby providing entity resolution and consolidation using the unique identifier.

9. The system of claim 8, wherein the DBA name is one of a plurality of DBA names associated with the unique entity.

10. The system of claim 8, wherein the unique identifier is a hash and is determined as part of a multi-phase process comprising a plurality of extract, transform, and load (ETL) phases, and wherein separate processing of entities having a source system identifier and missing the source system identifier is performed in one of the ETL phases prior to processing the unique identifier in a subsequent one of the ETL phases.

11. The system of claim 10, wherein the hash is based at least in part on information about the unique entity.

12. The system of claim 10, wherein the hash is based at least in part on a uniform resource locator associated with the unique entity.

13. The system of claim 8, wherein the supply chain data comprises global trade data, cyber data, and government spending data.

14. The system of claim 8, wherein the computer readable instructions controlling the processing device are further configured to perform operations comprising:

performing a supply chain analysis using the supply chain data updated with the unique identifier, wherein the supply chain analysis identifies one or more potential risks associated with the unique entity.

15. A computer program product comprising a computer readable storage medium having program instructions embodied therewith, the program instructions executable by a processor to cause the processor to perform operations comprising:

receiving supply chain data from a plurality of data sources distributed across a network;

analyzing the supply chain data to identify an entity and a doing business as (DBA) name associated with the entity;

generating a unique identifier for the entity;

identifying a second DBA name associated with a second entity in the supply chain data;

comparing information about the DBA name and the second DBA name to determine whether the DBA name and the second DBA name are both associated with a same entity;

grouping the second DBA name and the second entity with the DBA name and the entity based on determining that the DBA name and the second DBA name are both associated with the same entity as a unique entity;

associating the unique identifier with the unique entity, the DBA name associated with the unique entity, and the second DBA name associated with the unique entity;

creating a data structure with a plurality of unique identifiers including the unique identifier to link multiple source data sets from the data sources as normalized dynamic data streams;

flowing updates from the source data sets based on data feeds of the data sources to the data structure through inheritance properties such that the updates are available at a predetermined interval; and updating the data structure to include the DBA name associated with the unique entity, and the second DBA name associated with the unique entity, thereby providing entity resolution and consolidation using the unique identifier.

16. The computer program product of claim 15, wherein the DBA name is one of a plurality of DBA names associated with the unique entity, the unique identifier is a hash, and the hash is based at least in part on information about the unique entity and/or a uniform resource locator associated with the unique entity.

17. The computer program product of claim 15, wherein the supply chain data comprises global trade data, cyber data, and government spending data.

18. The computer program product of claim 15, wherein the program instructions executable by the processor to cause the processor to further perform operations comprising:

performing a supply chain analysis using the supply chain data updated with the unique identifier, wherein the supply chain analysis identifies one or more potential risks associated with the unique entity, and wherein the supply chain data is received from a plurality of sources.

* * * * *